United States Patent
Miyazaki et al.

(10) Patent No.: US 8,232,340 B2
(45) Date of Patent: Jul. 31, 2012

(54) RUBBER COMPOSITION FOR CHAFER

(75) Inventors: Tatsuya Miyazaki, Kobe (JP); Hirokazu Ishida, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 88 days.

(21) Appl. No.: 12/500,663

(22) Filed: Jul. 10, 2009

(65) Prior Publication Data

US 2010/0048799 A1 Feb. 25, 2010

(30) Foreign Application Priority Data

Aug. 20, 2008 (JP) ................... 2008-211521
Dec. 15, 2008 (JP) ................... 2008-318209

(51) Int. Cl.
*C08K 3/36* (2006.01)
(52) U.S. Cl. ........................ 524/451; 524/526
(58) Field of Classification Search .......... 524/451, 524/526
See application file for complete search history.

(56) References Cited

U.S. PATENT DOCUMENTS

| 7,393,902 B2 * | 7/2008 | Miyazaki | 525/236 |
| 2005/0211362 A1 | 9/2005 | Hirayama | |
| 2006/0292356 A1 * | 12/2006 | Minagoshi | 428/295.1 |

FOREIGN PATENT DOCUMENTS

| DE | 60 2005 003 903 T2 | 12/2008 |
| EP | 1 652 882 B1 | 12/2007 |
| EP | 1 970 404 A1 * | 9/2008 |
| EP | 1 970 404 A1 | 9/2008 |
| EP | 1 970 404 A1 * | 9/2008 |
| EP | 2 072 289 A1 | 6/2009 |
| JP | 2005271857 * | 10/2005 |
| JP | 2005271857 A | 10/2005 |
| JP | 2006-63143 A | 3/2006 |

OTHER PUBLICATIONS

German Office Action issued Jul. 1, 2010, in corresponding German Application No. 10 2009 031 656.6-43 and translation.
Japanese Office Action dated Oct. 18, 2011 from the corresponding Japanese Patent Application (File No. JP-17050).

* cited by examiner

*Primary Examiner* — Robert D. Harlan
(74) *Attorney, Agent, or Firm* — Birch, Stewart, Kolasch & Birch, LLP

(57) ABSTRACT

The object of the present invention is to provide a rubber composition having high breaking strength, excellent in bead durability without the generation of rubber cracking during mounting and demounting of the rim, and excellent in fuel efficiency.

The present invention relates a rubber composition for a chafer comprising:

(A) a diene rubber comprising
 (A1) 10 to 60% by mass of a butadiene rubber containing 2.5 to 20% by mass of a 1,2-syndiotactic polybutadiene crystal,
 (A2) 5 to 50% by mass of a tin-modified butadiene rubber polymerized with a lithium initiator and having 50 to 3000 ppm content of tin atoms, 5 to 50% by mass of vinyl bond amount and a molecular weight distribution of at most 2.0, and
 (A3) 20 to 75% by mass of a diene rubber other than the butadiene rubber (A1) and the tin-modified butadiene rubber (A2); and
(B) 5 to 30 parts by mass of silica (B) based on 100 parts by mass of the diene rubber components, wherein elongation at break of the rubber composition for a chafer is at least 280%.

4 Claims, No Drawings

RUBBER COMPOSITION FOR CHAFER

BACKGROUND OF THE INVENTION

The present invention relates to a rubber composition for a chafer.

In general, a belt part (also referred to as a breaker) configuring a tire and a bead part contacting a rim play an important role in the durability of a tire used in a truck or a bus, and a hard rubber (below, also referred to as a chafer) is used to suppress deformation of the rubber. It is desirable to make the rubber hard to suppress the deformation of the rubber. However, because the tip of the chafer breaks during mounting and demounting of the rim if the rubber is made to be too hard, the hardness is generally set to 70 to 75. However, in order to improve the durability of the bead part in a use condition such as a large load, a hardness of at least 76 becomes necessary.

In order to improve the rubber hardness, the rubber composition is made hard by compounding a reinforcing filler such as a carbon black, and a method of improving the hardness by making the rubber component a specified component is used. For example, as in Patent Document 1, it becomes possible to exhibit a hardness of at least 75 by making the butadiene rubber that is used a polybutadiene that contains a 1,2-syndiotactic crystal. However, it is difficult to obtain good fuel efficiency and to suppress a change in physical properties with time even when using these techniques.

Further, a normal bead structure is that the bead is sandwiched between a bead wire (iron) and a lever roller (iron), and a canvas chafer covers the vicinity around the wire. However, a rubber chafer is known in which fiber reinforcement by canvas is not used in order to improve productivity and reduce the weight. Incidentally, in the case of using a blend of the rubber components in Patent Document 1 as the rubber chafer, it is difficult to improve the elongation at break, it was impossible to remove the canvas chafer, and it is difficult to improve the productivity and reduce the weight.

Further, a rubber composition having low elongation at break has a problem that the lever during rim assembly breaks the rubber around a bead toe, and in general, in order to improve the elongation at break, a method such as making the carbon black into fine particles or increasing the content of natural rubber can be considered. However, there is a problem that the low heat build-up property deteriorates.

[Patent Document 1] Japanese Unexamined Patent Publication No. 2006-63143

SUMMARY OF THE INVENTION

The objective of the present invention is to provide a rubber composition having high strength at break, excellent in bead durability without generation of rubber cracking of a chafer during mounting and demounting of the rim, and excellent in fuel efficiency.

The present invention relates a rubber composition for a chafer comprising:

(A) a diene rubber comprising (A1) 10 to 60% by mass of a butadiene rubber containing 2.5 to 20% by mass of a 1,2-syndiotactic polybutadiene crystal, (A2) 5 to 50% by mass of a tin-modified butadiene rubber polymerized with a lithium initiator and having 50 to 3000 ppm content of tin atoms, 5 to 50% by mass of vinyl bond amount and a molecular weight distribution of at most 2.0, and (A3) 20 to 75% by mass of a diene rubber other than the butadiene rubber (A1) and the tin-modified butadiene rubber (A2); and (B) 5 to 30 parts by mass of silica (B)

based on 100 parts by mass of the diene rubber components, wherein elongation at break of the rubber composition for a chafer is at least 280%.

Furthermore, at most 10 parts by mass of a silane coupling agent based on 100 parts by mass of the silica are preferably included in the rubber composition for a chafer.

The rubber composition for a chafer of the present invention is preferably used for a rubber chafer.

DETAILED DESCRIPTION

The rubber composition for a chafer in the present invention includes (A) a butadiene rubber including that contains a 1,2-syndiotactic polybutadiene crystal (below, also referred to as SPB-containing BR) (A1), 5 to 50% by mass of a tin-modified butadiene rubber (below, also referred to as tin-modified BR) (A2), a diene rubber (A3) other than the SPB-containing BR (A1) and the tin-modified BR (A2), and silica (B).

In the SPB-containing BR (A1) of the diene rubber component (A), the 1,2-syndiotactic polybutadiene crystal is preferably chemically bonded with BR (butadiene rubber) and then dispersed, not just dispersing the crystal into BR. By making the above-described crystal chemically bond with the rubber component and then dispersing, the generation and spread of cracks tend to be suppressed.

Further, because the 1,2-syndiotactic polybutadiene crystal included in BR has sufficient hardness, sufficient complex modulus can be obtained even if the cross-linking density is small. Because of that, abrasion resistance of the obtained rubber composition can be improved.

The melting point of the 1,2-syndiotactic polybutadiene crystal is preferably at least 180° C. and more preferably at least 190° C. When the melting point is less than 180° C., the crystal tends to melt during the vulcanization of the tire in a press, and there is a tendency that the hardness decreases. Further, the melting point of the 1,2-syndiotactic polybutadiene crystal is preferably at most 220° C. and more preferably at most 210° C. When the melting point exceeds 220° C., because the molecular weight of BR becomes large, there is a tendency that dispersibility decreases in the rubber composition.

The content of boiling n-hexane insoluble matter in the SPB-containing BR is preferably at least 2.5% by mass and more preferably at least 8% by mass. When the content is less than 2.5% by mass, there is a tendency that sufficient hardness of the rubber composition cannot be obtained. Further, the content of boiling n-hexane insoluble matter is preferably at most 22% by mass, more preferably at most 20% by mass, and further preferably at most 18% by mass. When the content exceeds 22% by mass, the viscosity of BR itself is high, and there is a tendency that the dispersibility of BR and filler in the rubber composition deteriorates. Here, the boiling n-hexane insoluble matter indicates 1,2-syndiotactic polybutadiene in the SPB-containing BR.

The content of the 1,2-syndiotactic polybutadiene crystal in the SPB-containing BR is at least 2.5% by mass and preferably at least 10% by mass. When the content is less than 2.5% by mass, the hardness is insufficient. Further, the content of the 1,2-syndiotactic polybutadiene crystal in BR is at most 20% by mass and preferably at most 18% by mass.

When the content exceeds 20% by mass, BR is difficult to be dispersed into the rubber composition, and processabilty deteriorates.

In view of the excellent rim chafing property and hardness (Hs), the content of the SPB-containing BR (A1) in the diene rubber component (A) is at least 2.5% by mass, preferably at least 10% by mass, and more preferably at least 15% by mass. Further, in view of a point that elongation at break improves and tan δ does not deteriorate, the content of the SPB-containing BR (A1) in the diene rubber component (A) is at most 60% by mass, preferably at most 55% by mass, and more preferably at most 50% by mass.

The tin-modified BR (A2) can be obtained by performing a polymerization of 1,3-butadiene with a lithium initiator and then adding a tin compound, and further the ends of the BR molecule are preferably bonded with a tin-carbon bond.

Examples of the lithium initiator include lithium compounds such as an alkyllithium, an aryllithium, an allyllithium, a vinyllithium, an organotin lithium, and an organonitrogen lithium compound. By using the lithium compound as the initiator for BR, a tin-modified BR can be produced with high vinyl and low cis content.

Examples of the tin compound include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene, and among those, one type or at least two types can be selected and used.

The content of tin atoms in the tin-modified BR (A2) is at least 50 ppm and preferably at least 60 ppm. When the content is less than 50 ppm, the effect of promoting the dispersion of the carbon black in the tin-modified BR tends to be small, and tan δ tends to deteriorate. Further, the content of tin atoms is at most 3000 ppm, preferably at most 2500 ppm, and more preferably at most 250 ppm. When the content exceeds 3000 ppm, cohesiveness of the kneaded product tends to become poor, the edges tend not to be aligned, and therefore extrusion properties of the kneaded product tend to deteriorate.

The molecular weight distribution (Mw/Mn) of the tin-modified BR (A2) is at most 2 and preferably at most 1.5. When Mw/Mn exceeds 2, the dispersibility of carbon black and tan δ tends to deteriorate. The lower limit of the molecular weight distribution is not especially limited. However, it is preferably 1.

In view of the excellent ablation resistance (a rim chafing property), the vinyl bond amount of the tin-modified BR (A2) is preferably at most 50% by mass and more preferably at most 20% by mass. Further, in view of the excellent manufacturing efficiency, the vinyl bond amount of the tin-modified BR (A2) is preferably at least 5% by mass and more preferably at least 7% by mass.

In view of an excellent low heat build-up property (tan δ), the content of the tin-modified BR (A2) in the diene rubber component (A) is at least 5% by mass, preferably at least 10% by mass, and more preferably at least 15% by mass. Further, in view of the fact that elongation at break is improved and of excellent Hs, the content of the tin-modified BR (A2) in the diene rubber component (A) is at most 50% by mass, preferably at most 45% by mass, and more preferably at most 40% by mass.

Examples of the diene rubber component (A3) other than the SPB-containing BR (A1) and the tin-modified BR (A2) described above include a natural rubber (NR), an isoprene rubber (IR), a styrene-butadiene rubber (SBR), a butadiene rubber having high cis content (high cis BR), and an epoxidized natural rubber (ENR), and among these, NR and IR are preferable in respect of strength at break and processability.

NR is not especially limited, NR that can be used in a normal rubber industry can be used, and specific examples include RSS#3 and TSR20.

Further, IR is also not especially limited, and IR that has been conventionally used in the tire industry can be used. Moreover, it is well known in a technical field that IR indicates the same properties as NR, because IR has the same chemical construction as NR.

High cis BR refers to BR having the content of cis 1,4-bonds of at least 90% with respect to the butadiene part of the obtained rubber.

A high cis BR on the market can be used as the high cis BR [high-cis BR] that is used in the present invention in the present invention, and examples of the high cis BR that can be preferably used include BR having high cis content (high cis BR) such as BR130B and BR150B manufactured by Ube Industries, Ltd.

In view of the excellent strength at break and Hs, the content of the diene rubber component (A3) other than the SPB-containing BR (A1) and the tin-modified BR (A2) in the diene rubber component (A) is preferably at least 20% by mass, more preferably at least 25% by mass, and further preferably at least 30% by mass. Further, in view of excellent rim chafing property, the content of the diene rubber component (A3) is preferably at most 75% by mass, more preferably at most 70% by mass, and further preferably at most 60% by mass.

With the rubber component in which the above-described SPB-containing BR (A1), tin-modified BR (A2), and diene rubber component (A3) are combined, tan δ can be reduced substantially without reducing the hardness and stress at break of the rubber composition.

In view of the fact that the elongation at break can be improved without affecting rim slippage abrasion and in view of excellent improvement of the low heat build-up property, the present invention further includes silica (B) as a filler.

In view of the excellent improvement of strength at break and improvement of the low heat build-up property, the content of silica (B) is at least 5 parts by mass based on 100 parts by mass of a diene rubber component (A), preferably at least 7 parts by mass, and more preferably at least 10 parts by mass. Further, in view of the excellent improvement of strength at break, improvement of the low heat build-up property, and maintaining of the rim chafing property, the content of silica (B) is at most 30 parts by mass based on 100 parts by mass of a diene rubber component (A), preferably at most 25 parts by mass, and more preferably at most 20 parts by mass.

$N_2SA$ of silica is preferably 30 to 220 $m^2/g$, more preferably 50 to 200 $m^2/g$, and further preferably 70 to 180 $m^2/g$. When $N_2SA$ is less than 30 $m^2/g$, there is a tendency that the rim chafing property deteriorates and the breaking strength decreases, and when $N_2SA$ exceeds 220 $M^2/g$, there is a tendency that the low heat build-up property deteriorates.

Because the reinforcing property and abrasion resistance exhibit sufficient effect to be used in a tire for passenger cars and the processability and the dispersibility are also good, Z115GR ($N_2SA$: 112 $m^2/g$) manufactured by Rhodia is suitably used.

Because the rubber composition of the present invention includes silica, a silane coupling agent is preferably further included in order to improve the dispersibility of silica.

The silane coupling agent is not especially limited, a silane coupling agent can be used as long as it has been conventionally compounded into the rubber composition with silica in the tire industry, and specific examples include sulfide compounds such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl) trisulfide, bis(2-triethoxysilylethyl)trisulfide, bis(4-triethoxysilylbutyl)trisulfide, bis(3-trimethoxysilylpropyl) trisulfide, bis(2-trimethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropylmethacrylatemonosulfide, and 3-trimethoxysilylpropylmethacrylatemonosulfide, mercapto compounds such as 3-mercaptopropyltrimethoxysilane, 3-mercaptopropyltriethoxysilane, 2-mercaptoethyltrimethoxysilane, and 2-mercaptoethyltriethoxysilane, vinyl compounds such as vinyltriethoxysilane and vinyltrimethoxysilane, amino compounds such as 3-aminopropyltriethoxysilane, 3-aminopropyltrimethoxysilane, 3-(2-aminoethyl)aminopropyltriethoysilane, and 3-(2-aminoethyl)aminopropyltrimethoxysilane, glycidoxy compounds such as γ-glycidoxypropyltriethoxysilane, γ-glycidoxypropyltrimethoxysilane, γ-glycidoxypropylmethyldiethoxysilane, and γ-glycidoxypropylmethyldimethoxysilane, nitro compounds such as 3-nitropropyltrimethoxysilane and 3-nitropropyltriethoxysilane, and chloro compounds such as 3-chloropropyltrimethoxysilane and, 3-chloropropyltriethoxysilane, 2-chloroethyltrimethoxysilane and 2-chloroethyltriethoxysilane and these silane coupling agents may be used alone, or at least two types may be combined and used. Among these, the silane coupling agents such as bis(3-triethoxysilylpropyl)tetrasulfide and bis(3-triethoxysilylpropyl)disulfide are preferably used.

In the case of including the silane coupling agent, in view of the excellent processability and low heat build-up property, the content of the silane coupling agent is preferably at least 4 parts by mass and more preferably at least 6 parts by mass based on 100 parts by mass of silca in the case that the amount of silica is at least 10 parts by mass based on 100 parts by mass of a diene rubber component. Further, for the reason that the silane coupling agent that is not involved in the coupling reaction promotes heat-oxidation deterioration and change with time of the rubber, the content of the silane coupling agent is preferably at most 10 parts by mass and more preferably at most 8 parts by mass based on 100 parts by mass of silca. Moreover, compounding of the silane coupling agent is unnecessary in the case that the content of silica is less than 10 parts by mass based on 100 parts by mass of a diene rubber component. In the case that the content of silica is at least 10 parts by mass based on 100 parts by mass of a diene rubber component, the dispersion of silica becomes difficult, and therefore the silane coupling agent is preferably compounded at 6 to 8% by mass to silica. In a tire for TB (trucks and buses), good fuel efficiency can be realized when silica reacts with the silane coupling agent, and elongation is exhibited in a part where silica does not react with the silane coupling agent and crack resistance can be improved.

Furthermore, in view of the excellent rim chafing property, the rubber composition in the present invention preferably includes carbon black.

In view of the excellent point that sufficient hardness can be obtained and that ablation resistance does not deteriorate at the rim, the content of carbon black is at least 30 parts by mass based on 100 parts by mass of a diene rubber component (A), preferably at least 35 parts by mass, and more preferably at least 40 parts by mass. Further, in view of the excellent point that tan δ does not deteriorate, the content of carbon black is at most 55 parts by mass based on 100 parts by mass of a diene rubber component (A) preferably at most 50 parts by mass, and more preferably at most 45 parts by mass.

The nitrogen absorption specific surface area ($N_2SA$) of carbon black is preferably 50 to 220 $m^2/g$, more preferably 60 to 200 $m^2/g$, and more preferably 70 to 150 $m^2/g$. When $N_2SA$ is less than 50 $m^2/g$, there is a tendency that the ablation resistance tends to deteriorate and the strength at break tends to deteriorate. When $N_2SA$ exceeds 220 $m^2/g$, there is a tendency that tan δ deteriorates. Practically, $N_2SA$ of carbon black that is used in a tire for PC (passenger cars) is preferably 70 $m^2/g$, and $N_2SA$ of carbon black that is used in a tire for TB (trucks and buses) is preferably 120 $m^2/g$.

Preferred examples of carbon black include N330, N351, N220, and N219 in the respect of the low heat build-up property, the rim chafing property, and strength at break.

In view of excellent improvement of the low heat build-up property and excellent rim chafing property, the total amount of the reinforcing filler such as silica (B) and carbon black is preferably at least 40 parts by mass based on 100 parts by mass of a diene rubber component (A), more preferably at least 45 parts by mass, and further preferably at least 50 parts by mass. Further, in view of excellent improvement of the low heat build-up property and excellent strength at break, the total amount of the reinforcing filler is preferably at most 62 parts by mass based on 100 parts by mass of a diene rubber component (A), more preferably at most 60 by mass, and further preferably at most 58 parts by mass.

The rubber composition in the present invention can include a compounding agent that is generally used in manufacturing of the rubber composition such as antioxidant, zinc oxide, stearic acid, aroma oil, wax, a vulcanization agent such as sulfur, and a vulcanization accelerator at an amount that is normally used depending on necessity other than the above-described rubber component (A), silica (B), silane coupling agent, and carbon black.

In view of the excellent point that an arm of an automatic mounter does not scratch a bead toe part and that a rubber crack origin is not generated, elongation at break EB of a rubber composition of the present invention in a tensile test is at least 280%, preferably at least 300%, and more preferably at least 320%. Further, the upper limit of elongation at break EB of the rubber composition is not especially limited. However, it is preferably at most 600%. Moreover, the tensile test is performed according to JIS-K6251.

Because of excellent low heat build-up property, breaking strength, and abrasion resistance, the rubber composition of the present invention is suitably used for a chafer, and especially suitably used as a rubber chafer that does not use fiber reinforcement by canvas such as a canvas chafer.

A pneumatic tire is manufactured with a normal method using the above-described rubber composition. That is, an unvulcanized tire is formed by performing an extrusion process on the rubber composition in the present invention in which the above-described compounding agents are compounded depending on necessity according to the shape of the chafer in the tire at an unvulcanized stage and by molding with a normal method on a tire molder. A pneumatic tire is obtained by heating and pressing this unvulcanized tire in a vulcanizing machine.

EXAMPLE

The present invention is specifically explained based on examples. However, the present invention is not limited to only these.

Next, various chemicals used in examples and comparative examples are explained.

Natural rubber (NR): TSR20

Emulsion styrene butadiene rubber (E-SBR): SBR1502 manufactured by JSR Corporation (styrene unit content: 23.5% by weight)

Modified solution styrene butadiene rubber (Modified S-SBR): HPR340 manufactured by JSR Corporation (styrene content: 10% by weight and vinyl content: 42% by weight)

SPB-containing BR1: VCR617 manufactured by Ube Industries, Ltd. (1,2-syndiotactic polybutadiene crystal dispersion, content of the 1,2-syndiotactic polybutadiene crystal: 17% by mass, melting point of the 1,2-syndiotactic polybutadiene crystal: 200° C., content of the boiling n-hexane insoluble matter: 15 to 18% by mass)

SPB-containing BR2: VCR412 manufactured by Ube Industries, Ltd. (1,2-syndiotactic polybutadiene crystal dispersion, content of the 1,2-syndiotactic polybutadiene crystal: 12% by mass, melting point of the 1,2-syndiotactic polybutadiene crystal: 200° C., content of the boiling n-hexane insoluble matter: 12.0% by mass, (cis-1,4-bond containing amount: 98% by mass, Mooney viscosity (100° C.): 45, reduced specific viscosity of SPB: 2.2))

Tin-modified butadiene rubber (tin-modified BR): BR1250 manufactured by Zeon Corporation (polymerized using lithium as an initiator, vinyl bond amount: 10 to 13% by mass, Mw/Mn: 1.5, content of tin atoms: 250 ppm)

1,4-high-cis BR: BR150B manufactured by Ube Industries, Ltd.

Carbon black N330: SHOWBLACK N330 manufactured by CABOT JAPAN K.K. ($N_2SA$: 79 $m^2/g$)

Carbon black N219: LI manufactured by Mitsubishi Chemical Corporation (nitrogen absorption specific surface area: 105 $m^2/g$)

Silica Z115GR: Z115GR manufactured by Rhodia ($N_2SA$: 112 $m^2/g$)

Silica VN3: Ultrasil VN3 manufactured by Degussa GmbH (N2SA: 210 $m^2/g$)

Silane coupling agent: Si69 manufactured by Degussa GmbH (bis(3-triethoxysilylpropyl)tetrasulfide)

Aroma oil: DIANA PROCESS AH-24 manufactured by Idemitsu Kosan Co., Ltd.

Wax: SANNOC manufactured by Ouchi Shinko Chemical Industrial Co., Ltd.

Antioxidant 6C: NOCRAC 6C manufactured by Ouchi Shinko Chemical Industrial Co., Ltd.

Antioxidant RD: Antioxidant: NONFLEX RD manufactured by Seiko Chemical Co., Ltd. (2,2,4-trimethyl-1,2-dihydroquinone)

Stearic acid: stearic acid available from NOF CORPORATION

Zinc oxide: Zinc oxide No. 1 manufactured by Mitsui Mining & Smelting Co., Ltd.

Tackifier resin: Escorez 1102 manufactured by Exxon Chemical Co.

Insoluble sulfur: SEIMISULFUR manufactured by NIPPON KANRYU INDUSTRY CO., LTD. (insoluble sulfur at least 60% insoluble by carbon disulfide, oil portion: 10%)

Vulcanization accelerator TBBS: Nocceler NS manufactured by Ouchi Shinko Chemical Industrial Co., Ltd. (N-tert-butyl-2-benzothiazolylsulfeneamide)

Examples 1 to 16 and Comparative Examples 1 to 12

Various chemicals except sulfur and the vulcanization accelerator TBBS were kneaded with a Banbury mixer according to the compounded amount shown in Tables 1 to 4. An unvulcanized rubber composition was obtained in the following manner that sulfur and the vulcanization accelerator TBBS were added into the obtained kneaded product at the compounded amount shown in Tables 1 to 4, and then kneaded with an open roll. Then, rubber sheets for testing in Examples 1 to 16 and Comparative Examples 1 to 12 were produced by vulcanizing the obtained unvulcanized rubber composition under a condition of 170° C. for 12 minutes, and the tests shown below were performed using the obtained rubber sheets for testing. Tables 1 and 2 show preferred combinations as a PC (for passenger cars) tire and a LT (light trucks) tire, and Tables 3 and 4 show preferred combinations as a TB (trucks and buses) tire.

Further, a rubber composition having a chafer shape was formed by extruding the above-described unvulcanized rubber composition with an extruder equipped with a cap having a prescribed shape and then molding the extruded rubber composition, a tire row cover was produced by laminating the obtained rubber composition on a tire molding machine with a normal method, a tire for testing was produced by vulcanizing this in a mold at 170° C. at pressure 25 $kgf/cm^2$, and the following measurements were carried out.

Tables 1 and 2 below show combinations used in a tire for passenger cars (PC) and a tire for light trucks (LT), and a tire for light trucks (LT) (tire size: 225/70R16 117/115) was produced experimentally.

Tables 3 and 4 below show combinations used in a tire for trucks and buses (TB), and a tire for trucks and buses (TB) (tire size: 11R22.5 14PR) was produced experimentally.

<Tensile Test>

The elongation at break EB (%) was measured by carrying out a tensile test using a No. 3 dumbbell type test piece containing the above-described vulcanized rubber composition according to JIS K 6251 "Vulcanized Rubber and Thermoplastic Rubber—Method of Obtaining Tensile Characteristics". Tables 1 and 2 show that the larger the EB is, the more excellent the rubber strength becomes.

<Viscoelasticity Test>

The complex modulus E* and loss tangent tan δ of the vulcanized rubber composition at 70° C. were measured under a condition of an initial strain of 10%, a dynamic strain of 2%, and a frequency of 10 Hz using a viscoelastic spectrometer available from Iwamoto Seisakusyo K.K. Tables 1 and 2 show that the larger the E* is, the higher the rigidity and hardness are, and that the smaller the tan δ is, the more excellent the low heat build-up property becomes.

Further, in Tables 3 and 4, rolling resistance is shown as an index by the following formula with tan δ in Example 10 being 100. The larger the index is, the more excellent rolling resistance becomes.

(Rolling resistance index)=(tan δ in Example 10)/(tan δ of each compound)×100

<Rim Chafing Property Test>

An unvulcanized tire was formed by molding the above-described unvulcanized rubber composition into a chafer shape and laminating to other tire members on the tire molding machine, and a truck tire for commercial vehicles (LT tire) (tire size: 225/70R16 117/115) was manufactured by pressing and vulcanizing for 15 minutes under a condition of 170° C. and 25 kgf/cm².

The abrasion depth of a rim flange contact part was measured after performing drum running on the tire for 600 hours at a speed of 20 km/h under a condition of 230% of the maximum load (maximum inner pressure condition) of the JIS standard. In Tables 1 and 2, the abrasion depth of each compound was shown as an index by the following formula with the index of the rim chafing property in Example 1 being 100. Moreover, it is shown that the larger the index of the rim chafing property is, the more difficult it is for rim slippage to occur and the smaller the abrasion amount is.

(Index of rim chafing property)=(Abrasion depth in Example 1)/(Abrasion depth of each compounding)×100

<Bead Durability Test>

Japanese Unexamined Patent Publication No. 2007-204733 can be used as a reference. A tread portion of the tire for testing contacting to a road surface was buffed and removed until the residual groove of the tire became 4 mm, the tire for testing was incorporated into a rim with a size of 8.25, and a run test was performed first for 96 hours under a condition of inner pressure 800 KPa, speed 20 km/h, and load 58 kN, and then for 96 hours in a condition of inner pressure 950 KPa, speed 20 km/h, and load 68 kN. Then, time until damage was generated in the bead was measured at inner pressure 1000 kPa, speed 20 km/h, and load 77 kN. Moreover, the test was performed at temperature 25° C.

In the tire for trucks and buses (TB), the run times in the Examples and Comparative Examples in Tables 3 and 4 were indexed with the run time with the damage (damage generation time of the bead) in Example 10 as 100. If the index of the bead durability is at least 100, it can be determined that there is an improvement effect, and shows that it passes.

<Cracking Resistance of the Rubber>

A sample tire was rim-assembled with an aluminum wheel rim of a JIS standard rim using a rim assembling machine (a hydraulic tire changer), a rim releasing test was performed to check whether there is toe cracking or not, and then grading was performed according to five ranks was performed. Moreover, an aluminum wheel rim was used in which the flange is worn away and surface scraping is generated, and the bead part of the sample tire was thinly coated with a paste for lubrication in advance, and then wiped off with a cloth.

(Comprehensive Evaluation)

A comprehensive evaluation was performed on the sample tire with the following criteria.

5: No cracking, smooth
4: No cracking, a level of scratching
3: Cracking at least 1 mm
2: Cracking at least 5 mm
1: Cracking at least 3 cm The above-described evaluation results are shown in Tables 1 to 4.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 14 | 15 | 16 |
| Compounded amount (parts by mass) | | | | | | | | | | | | |
| NR | 40 | 40 | 40 | 40 | 40 | 40 | 60 | 40 | 40 | 40 | 40 | 40 |
| E-SBR | — | — | — | — | — | — | — | — | — | 10 | — | — |
| Modified S-SBR | — | — | — | — | — | — | — | — | — | — | 10 | 10 |
| SPB-containing BR1 | 20 | 40 | 50 | 20 | 20 | 20 | 20 | 20 | 20 | 20 | 20 | 10 |
| Tin-modified BR | 40 | 20 | 10 | 40 | 40 | 40 | 20 | 40 | 40 | 30 | 30 | 40 |
| Carbon black N330 | 45 | 45 | 45 | 50 | 35 | 55 | 45 | 35 | 45 | 45 | 45 | 45 |
| Silica Z115GR | 10 | 10 | 10 | 5 | 20 | 10 | 10 | 20 | 10 | 10 | 10 | 10 |
| Silane coupling agent | 0.8 | 0.8 | 0.8 | 0.4 | 1.6 | 0.8 | 0.8 | 0.8 | 0.8 | 0.8 | 0.8 | 0.8 |
| Aroma oil | 6 | 6 | 6 | 6 | 6 | 6 | 6 | 6 | 6 | 6 | 6 | 6 |
| Wax | 1 | 1 | 1 | 1 | 1 | 1 | 1 | 1 | 1 | 1 | 1 | 1 |
| Antioxidant 6C | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 | 3 | 3 |
| Insoluble sulfur (oil 10%) | 2.33 | 2.33 | 2.33 | 2.33 | 2.33 | 2.33 | 2.33 | 2.33 | 2.33 | 2.33 | 2.33 | 2.33 |
| (pure sulfur portion) | (2.10) | (2.10) | (2.10) | (2.10) | (2.10) | (2.10) | (2.10) | (2.10) | (2.10) | (2.10) | (2.10) | (2.10) |
| Vulcanization accelerator TBBS | 2.0 | 2.0 | 2.0 | 2.0 | 2.0 | 1.4 | 2.0 | 3.0 | 2.0 | 2.0 | 2.0 | 2.0 |
| Evaluation result | | | | | | | | | | | | |
| Elongation at break EB (%) | 320 | 305 | 290 | 295 | 345 | 340 | 375 | 290 | 340 | 310 | 290 | 300 |
| E* 70° C. | 6.0 | 6.9 | 7.2 | 6.4 | 5.7 | 6.7 | 6.1 | 6.2 | 6.3 | 6.9 | 6.8 | 6.1 |
| tan δ 70° C. | 0.096 | 0.108 | 0.114 | 0.120 | 0.091 | 0.120 | 0.104 | 0.084 | 0.099 | 0.112 | 0.095 | 0.089 |
| Rim chafing property | 100 | 115 | 120 | 110 | 90 | 135 | 85 | 90 | 103 | 100 | 100 | 95 |
| Cracking resistance of rubber | 4 | 4 | 4 | 4 | 5 | 5 | 5 | 4 | 5 | 4 | 4 | 4 |

TABLE 2

| | Comparative Example | | | | | | | | |
|---|---|---|---|---|---|---|---|---|---|
| | 1 | 2 | 3 | 4 | 5 | 6 | 7 | 8 | 9 |
| Compounded amount (parts by mass) | | | | | | | | | |
| NR | 40 | 40 | 40 | 40 | 40 | 40 | 20 | 40 | 40 |
| SPB-containing BR1 | 20 | 60 | 60 | 20 | 20 | 20 | 60 | 20 | 20 |
| Tin-modified BR | — | — | — | 40 | 40 | 40 | 20 | 40 | 40 |
| 1,4-high-cis BR | 20 | — | — | — | — | — | — | — | — |
| Carbon black N330 | 45 | 45 | 55 | 55 | 15 | 15 | 15 | 45 | 55 |
| Silica Z115GR | 10 | 10 | — | — | 40 | 40 | 40 | 10 | 10 |
| Silane coupling agent | 0.8 | 0.8 | — | — | 3.2 | 3.2 | 3.2 | 0.8 | 0.8 |
| Aroma oil | 6 | 6 | 6 | 6 | 6 | 6 | 6 | 6 | 6 |
| Wax | 1 | 1 | 1 | 1 | 1 | 1 | 1 | 1 | 1 |
| Antioxidant 6C | 3 | 3 | 3 | 3 | 3 | 3 | 3 | 3 | 3 |
| Stearic acid | 2 | 2 | 2 | 2 | 2 | 2 | 2 | 2 | 2 |
| Zinc oxide | 3 | 3 | 3 | 3 | 3 | 3 | 3 | 3 | 3 |
| Insoluble sulfur (oil 10%) | 2.33 | 2.33 | 2.33 | 2.33 | 2.33 | 2.33 | 2.33 | 2.33 | 2.33 |
| (pure sulfur portion) | (2.10) | (2.10) | (2.10) | (2.10) | (2.10) | (2.10) | (2.10) | (2.10) | (2.10) |
| Vulcanization accelerator TBBS | 2.0 | 2.0 | 2.0 | 2.0 | 2.0 | 3.0 | 2.0 | 3.0 | 2.0 |
| Evaluation result | | | | | | | | | |
| Elongation at break EB (%) | 330 | 300 | 260 | 270 | 390 | 300 | 270 | 250 | 265 |
| E* 70° C. | 6.1 | 7.5 | 7.7 | 6.4 | 5.3 | 6.1 | 5.8 | 7.0 | 8.0 |
| tan δ 70° C. | 0.135 | 0.141 | 0.145 | 0.103 | 0.088 | 0.080 | 0.105 | 0.091 | 0.110 |
| Rim chafing property | 105 | 120 | 130 | 115 | 45 | 50 | 60 | 80 | 90 |
| Cracking resistance of rubber | 5 | 4 | 1 | 2 | 5 | 4 | 2 | 1 | 2 |

TABLE 3

| | Example | | | |
|---|---|---|---|---|
| | 10 | 11 | 12 | 13 |
| Compounded amount (parts by mass) | | | | |
| NR | 50 | 40 | 30 | 40 |
| SPB-containing BR2 | 40 | 50 | 60 | 40 |
| Tin-modified BR | 10 | 10 | 10 | 20 |
| Carbon black N219 | 50 | 50 | 30 | 50 |
| Silica VN3 | 10 | 10 | 30 | 10 |
| Silane coupling agent | 0.5 | 0.5 | 1.5 | 0.5 |
| Wax | 1.5 | 1.5 | 1.5 | 1.5 |
| Antioxidant 6C | 3 | 3 | 3 | 3 |
| Antioxidant RD | 1 | 1 | 1 | 1 |
| Stearic acid | 2 | 2 | 2 | 2 |
| Zinc oxide | 3 | 3 | 3 | 3 |
| Tackiifier resin | 2 | 2 | 2 | 2 |
| Sulfur | 1.5 | 1.5 | 1.5 | 1.5 |
| Vulcanization accelerator TBBS | 2.4 | 2.4 | 2.4 | 2.4 |
| Evaluation result | | | | |
| Rolling resistance for rubber | 100 | 102 | 109 | 106 |
| Bead durability | 100 | 110 | 113 | 100 |
| Cracking resistance for rubber | 3 | 3 | 5 | 3 |

TABLE 4

| | Comparative Example | | |
|---|---|---|---|
| | 10 | 11 | 12 |
| Compounded amount (parts by mass) | | | |
| NR | 40 | 50 | 30 |
| SPB-containing BR2 | 60 | 40 | 60 |
| Tin-modified BR | — | 10 | 10 |
| Carbon black N219 | 30 | 60 | 10 |
| Silica VN3 | 30 | — | 50 |
| Silane coupling agent | 1.5 | — | 2.5 |
| Wax | 1.5 | 1.5 | 1.5 |
| Antioxidant 6C | 3 | 3 | 3 |
| Antioxidant RD | 1 | 1 | 1 |
| Stearic acid | 2 | 2 | 2 |
| Zinc oxide | 3 | 3 | 3 |
| Tackiifier resin | 2 | 2 | 2 |
| Sulfur | 1.5 | 1.5 | 1.5 |
| Vulcanization accelerator TBBS | 2.4 | 2.4 | 2.4 |
| Evaluation result | | | |
| Rolling resistance for rubber | 98 | 97 | 118 |
| Bead durability | 103 | 105 | 75 |
| Cracking resistance for rubber | 4 | 2 | 5 |

According to the present invention, because a butadiene rubber including a 1,2-syndiotactic polybutadiene crystal is included as a rubber component and silica is included as a reinforcing filler, the content of carbon black can be decreased, and rigidity of the rubber composition can be improved. Further, by including a tin-modified butadiene rubber as the rubber component in the present invention, fuel efficiency can be improved.

Accordingly, the rubber composition of the present invention is excellent in bead durability without generation of rubber cracking in a chafer during mounting and demounting of the rim, and has excellent fuel efficiency.

What is claimed is:

1. A rubber composition for a chafer comprising:

(A) a diene rubber comprising (A1) 10 to 60% by mass of a butadiene rubber containing 2.5 to 20% by mass of a 1,2-syndiotactic polybutadiene crystal, (A2) 5 to 50% by mass of a tin-modified butadiene rubber polymerized with a lithium initiator and having 50 to 3000 ppm content of tin atoms, 5 to 50% by mass of vinyl bond amount and a molecular weight distribution of at most 2.0, and (A3) 20 to 75% by mass of a diene rubber other than the butadiene rubber (A1) and the tin-modified butadiene rubber (A2); and (B) 5 to 30 parts by mass of silica (B) based on 100 parts by mass of the diene rubber components, wherein elongation at break of the vulcanized rubber composition for a chafer is at least 280%, complex modulus E* of the same is not less than 5.7, and loss tangent tan δ of the same is not more than 0.120, and index of rim chafing property of a tire for passenger cars and light trucks which tire is composed of the chafer using the vulcanized rubber composition for a chafer is not less than 85.

2. The chafer of claim 1, the rubber composition further comprising at most 10 parts by mass of a silane coupling agent based on 100 parts by mass of the silica.

3. The chafer of claim 1 or 2, wherein the nitrogen absorption specific surface area of the silica (B) is 30 to 220 $m^2/g$.

4. The chafer of claim 1, wherein the content of silica (B) is 5 to 20 parts by weight.

* * * * *